JAMES HANLEY.
Improved Machanical Movement for Sewing Machines and other Machinery.
No. 4,583.
Reissued Oct. 10, 1871.
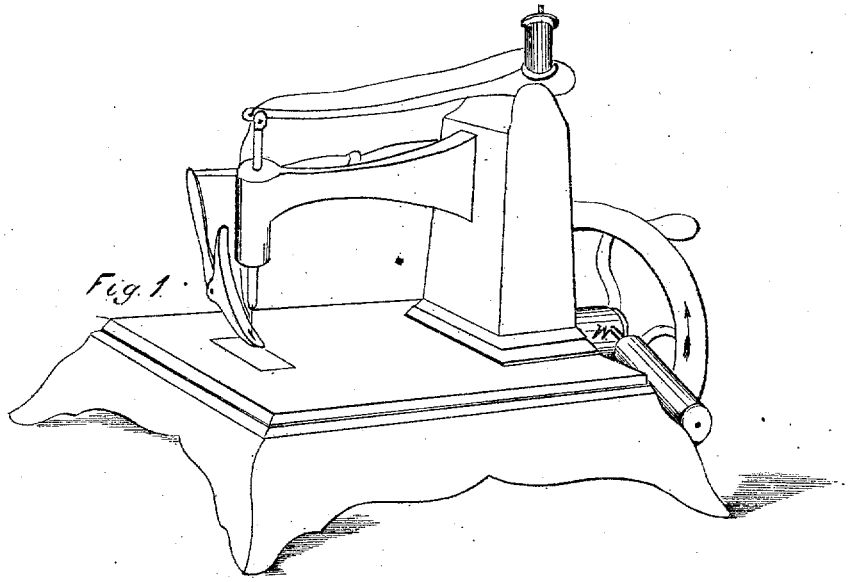
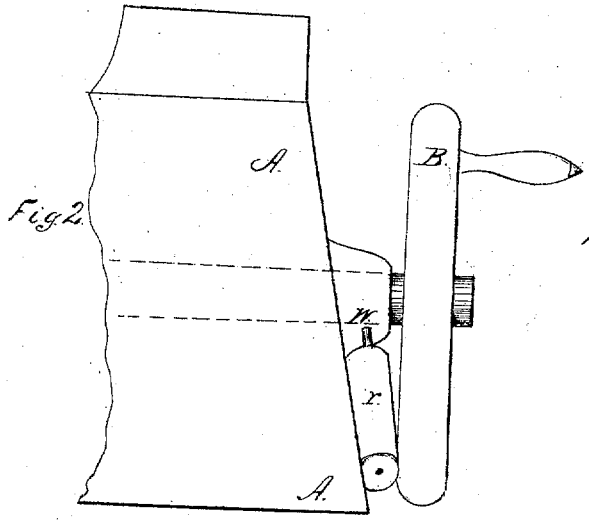
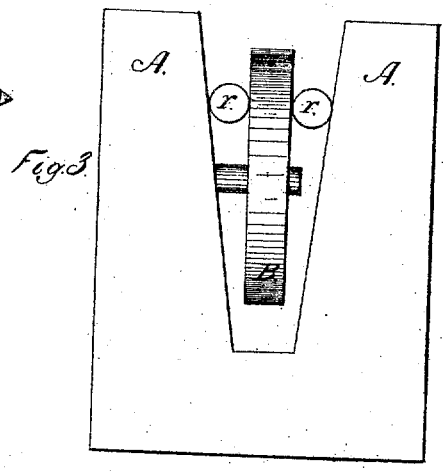
WITNESSES:
Edward C. Osborne
Robert H. Manners
INVENTOR:
James Hanley
per L. A. Dargavetty
AM. PHOTO-LITHOGRAPHIC CO. N.Y. (OSBORNE'S PROCESS.)

UNITED STATES PATENT OFFICE.

JAMES HANLEY, OF NEW YORK, N. Y.

IMPROVEMENT IN MECHANICAL MOVEMENTS FOR SEWING AND OTHER MACHINERY.

Specification forming part of Letters Patent No. 18,845, dated December 15, 1857; reissue No. 4,583, dated October 10, 1871.

*To all whom it may concern:*

Be it known that I, JAMES HANLEY, of the city, county, and State of New York, have invented a certain improvement or device to prevent the retrograde movement in sewing and other machines, of which the following is a specification:

My invention has for its object a cheap and effectual means of mechanism to prevent a retrograde or backward movement in sewing or other machines, which, for obvious reasons, it is desirable to propel in one direction only; and it consists in the employment of a roller, or equivalent, so constructed and applied that as the balance-wheel or prime-mover of the machine is revolved the roller is moved away from the wheel; but when the wheel is turned in the reverse direction the roller is caused to jam or impinge upon the periphery of the wheel, and between it and a rigid surface, and effectually prevent any backward motion of the wheel.

Figure 1 of the drawing is a perspective view of a sewing-machine with my improvement. Fig. 2 is a side elevation of a portion of a sewing-machine frame and my improved device; and Fig. 3 is a modification, in which rollers are made to work in a conical recess upon both sides of the balance or driving-wheel of a sewing-machine.

In Fig. 1, A A represent the bed of a sewing-machine; B, the balance-wheel or driving-wheel. Between the perimeter of the wheel B and the side of the machine an elastic or yielding roller, *r*, is located so as to revolve freely upon a pin or journal, W, secured to a proper part of the machine. The side of the machine upon which the roller is located is inclined, as shown in Figs. 1 and 2. The pin W upon which the roller turns is slightly elastic; and it will be readily understood that when the wheel B is revolved in the direction of the arrow the roller will turn freely or be carried away from the surface of the wheel, while if the wheel is turned in the reverse direction it will pinch or impinge upon the inclined side of the machine, which forms a conical seat for the roller, and effectually holds the wheel from being turned back.

I am aware that retrograde motion in machines has been prevented by means of a pawl and ratchet and friction-band, and I therefore disclaim such devices; but

I claim as my invention—

The employment of a roller, or equivalent, so constructed and arranged that it shall be free to revolve with or be carried away from the balance or driving-wheel of a machine when moved in the proper direction, and to impinge upon or jam against the periphery of the wheel by being forced into or upon an inclined surface or recess, substantially as described, and for the purpose specified.

JAMES HANLEY.

Witnesses:

EDWARD E. OSBORN,

C. A. DURGIN.

(134)